United States Patent [19] [11] 3,972,464
Codo et al. [45] Aug. 3, 1976

[54] FRICTION WELDED FILTER HOUSING

[75] Inventors: Edward A. Codo; Donald J. Larson, both of Joliet, Ill.

[73] Assignee: Caterpillar Tractor Co., Peoria, Ill.

[22] Filed: Mar. 27, 1974

[21] Appl. No.: 455,501

[52] U.S. Cl.............................. 228/112; 228/184; 228/161
[51] Int. Cl.² ....................................... B23K 19/02
[58] Field of Search .......... 29/470.3; 210/130, 435, 210/445–448, 450; 228/2, 112–114, 161, 184

[56] References Cited
UNITED STATES PATENTS

| | | | |
|---|---|---|---|
| 2,014,105 | 9/1935 | Dooley | 210/446 X |
| 2,679,090 | 5/1954 | Farr | 29/470.3 |
| 2,723,035 | 11/1955 | Anderson | 210/435 X |
| 3,144,710 | 8/1964 | Hollander et al. | 29/470.3 |
| 3,548,487 | 6/1967 | Stamm | 228/112 X |
| 3,568,299 | 3/1971 | Calton et al. | 29/470.3 |

FOREIGN PATENTS OR APPLICATIONS 963,681  7/1964  United Kingdom................ 228/113

Primary Examiner—Charles N. Hart
Assistant Examiner—Richard W. Burks
Attorney, Agent, or Firm—Phillips, Moore, Weissenberger, Lempio & Strabala

[57]  ABSTRACT

A method to provide a sealingly bonded filter housing comprises the steps of bonding a first end member to a first end of a body portion, forming an aperture in said body portion, and bonding a second end member to a second end of the body portion, to provide a sealingly bonded filter housing.

1 Claim, 1 Drawing Figure

U.S. Patent   Aug. 3, 1976   3,972,464
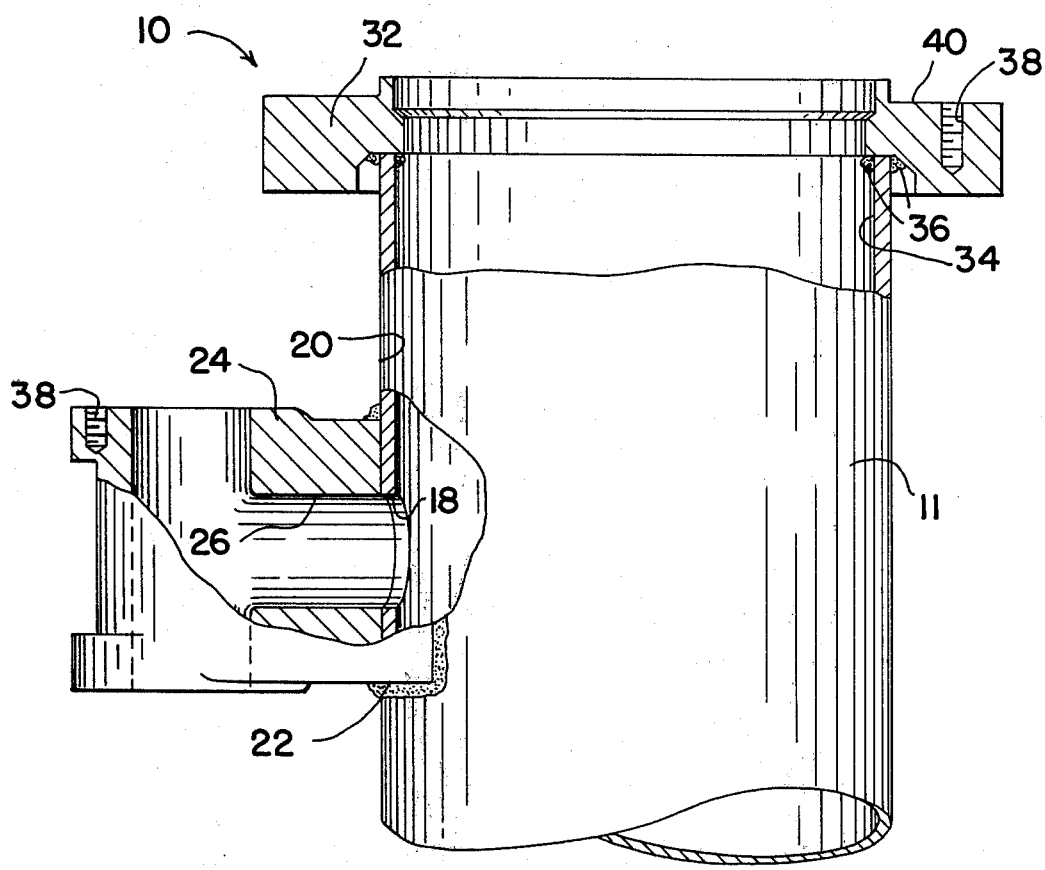
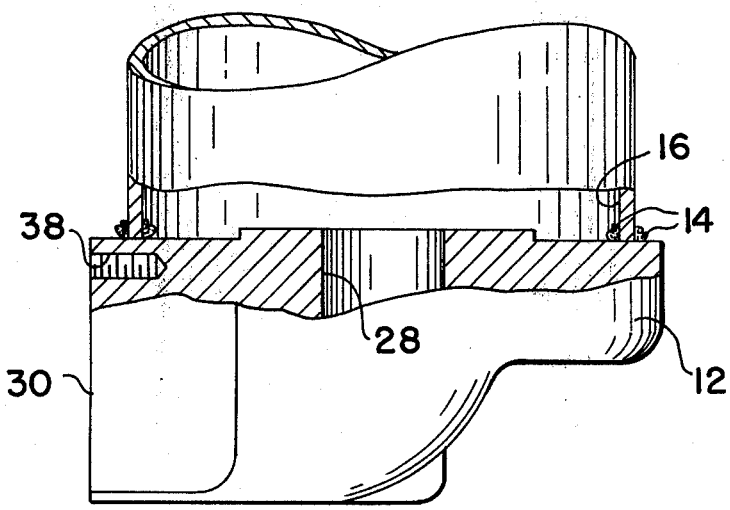

FRICTION WELDED FILTER HOUSING

BACKGROUND OF THE INVENTION

This invention relates to providing a sealingly bonded filter housing for machines having regularly or sporadically high fluid pressure loads on such filter housing.

A recurring problem with previous means of bonding the component elements of fluid filter housings has been leakage of fluid therefrom under high pressure loads. Various means to prevent such undesirable fluid leakage have been various gasket and "O"-ring means, with some success being achieved thereby, but resulting in relatively complicated construction. (See: U.S. Pat. No. 3,314,542 to Kudlaty.)

Various other attempts to provide a method to bondingly seal fluid filter housings have included arc welding which has the undesirable side-effects of being an expensive and time-consuming manufacturing process, and has the further side-effect of a high rate of "pin-hole" leaks resulting from the application of such process.

SUMMARY AND OBJECTS OF THE INVENTION

Broadly stated, the method to provide a sealingly bonded filter housing comprises the steps of friction welding a first end member to a first end of a body portion, forming an aperture in said body portion, and sealingly bonding a second end member to a second end of the body portion; whereby a sealingly bonded filter housing accepting at least one filter element is provided.

Broadly stated, the invention also comprises a filter housing which is assembled by friction welding comprising a body portion, a first end member friction welded to a first end of the body portion, and a second end member friction welded to a second end of the body portion.

Accordingly, an object of this invention is to provide a sealingly bonded filter housing capable of withstanding high internal fluid pressure loads, and method of construction thereof.

Another object of this method is to provide an easy to manufacture and structurally integral fluid filter housing utilizing readily available art and immediately feasible methods to provide such housing capable of withstanding high internal pressure loads.

BRIEF DESCRIPTION OF THE DRAWING

Other objects and advantages of this process will become apparent from the following description and drawing wherein:

FIG. 1 is an elevated sectional view of a fluid filter housing manufactured by applicants' method, and is the preferred embodiment thereof.

DETAILED DESCRIPTION

Referring to FIG. 1, a method to provide a sealingly bonded fluid filter housing 10 comprises the steps of friction welding by well-known process, such as set forth in U.S. Pat. No. 3,568,299 to Calton et al., the components in a predetermined order.

A typical assembly sequence of a filter housing 10 able to withstand high internal fluid pressures and accepting at least one filter element (not shown) using applicant's method, comprises the steps of sealingly bonding a tubular generally cylindrical body portion 11 to a first end member or annular base 12 by a first friction weld 14 at a first end 16 of the body portion 11. A lateral inlet aperture 18 is then formed in a sidewall section 20 of the body portion 11. A second end member or annular mounting flange 32 is then sealingly bonded to the body portion 11 by a second friction weld 36 at a second end 34 of the body portion 11; whereby a filter housing 10 capable of accepting at least one filter element (not shown) is provided.

After this bonding process is accomplished, an inlet adapter 24 associated with the inlet aperture 18 is attached, as by an arc weld 22, to the side-wall section 20 of the body portion 11. The inlet adapter 24 includes an inlet passage 26 to communicate fluid under pressure into the filter housing 10; which fluid is then filtered and subsequently exits the filter housing 10 through an outlet passage 28 defined by and through the first end member 12 to be returned to the parent fluid system (not shown) through an outlet conduit (not shown) secured to a mounting face 30.

After this process, in the preferred embodiment of the method, bores 38 are formed on a mounting face 40 of the second end member or mounting flange 32, and threads are formed in these bores 38 to accept mounting bolts (not shown) in a secure threadably engaged relationship. Bores 38 are then formed in the mounting face 30 and inlet adapter 24 to provide means to mount the filter housing 10 in a chosen location.

The bores 38 are formed as the last step in this method because the relative angular disposition of the friction welded members cannot be ascertained prior to such welding. Forming the bores 38 after all of the friction welds are accomplished allows proper alignment to be determined between the first mounting face 30 and the inlet adapter 24 and between the bores 38 and the respective mounting surfaces (not shown).

We claim:

1. A method of making a filter housing comprising, in the following sequence, the steps of
   first friction welding a cylindrical body portion to a first end member,
   then providing an aperture in said body portion,
   thereafter friction welding a second end member to the other end of the cylindrical body portion,
   attaching an inlet adapter to the cylindrical body portion in communication with said aperture,
   and finally providing threaded bores in the second end member mounting thereof.

* * * * *